(12) United States Patent
Zhang et al.

(10) Patent No.: US 9,640,294 B2
(45) Date of Patent: May 2, 2017

(54) SINGLE-LAYER MULTI-POINT TOUCH-CONTROL CONDUCTIVE FILM

(71) Applicants: NANCHANG O-FILM TECH CO., LTD., Nanchang (CN); SUZHOU O-FILM TECH CO., LTD., Suzhou (CN); SHENZHEN O-FILM TECH CO., LTD., Shenzhen (CN)

(72) Inventors: Sheng Zhang, Nanchang (CN); Ying Gu, Nanchang (CN); Hongwei Kang, Nanchang (CN); Yulong Gao, Nanchang (CN); Shengbo Guo, Nanchang (CN); Yunliang Yang, Nanchang (CN)

(73) Assignees: Nangchang O-Film Tech Co., Ltd., Nanchang (CN); Suzhou O-Film Tech Co., Ltd., Suzhou (CN); Shenzhen O-Film Tech Co., Ltd., Shenzhen (CN)

( * ) Notice: Subject to any disclaimer, the term of this patent is extended or adjusted under 35 U.S.C. 154(b) by 37 days.

(21) Appl. No.: 14/265,313

(22) Filed: Apr. 29, 2014

(65) Prior Publication Data

US 2014/0356582 A1 Dec. 4, 2014

(30) Foreign Application Priority Data

May 30, 2013 (CN) .......................... 2013 1 0209616
May 30, 2013 (CN) .......................... 2013 1 0210075
May 30, 2013 (CN) .......................... 2013 1 0210426

(51) Int. Cl.
*H01B 1/02* (2006.01)
*G06F 3/044* (2006.01)

(52) U.S. Cl.
CPC ................ *H01B 1/02* (2013.01); *G06F 3/044* (2013.01); *G06F 2203/04103* (2013.01); *G06F 2203/04111* (2013.01); *Y10T 428/24612* (2015.01)

(58) Field of Classification Search
CPC ........ G06F 3/044; G06F 3/041; G06F 3/0488; G06F 3/04883; G06F 3/04886;
(Continued)

(56) References Cited

U.S. PATENT DOCUMENTS

2011/0232947 A1 9/2011 Fan ................................ 174/255
2012/0032914 A1* 2/2012 Kim ........................ G06F 3/044
345/174

(Continued)

FOREIGN PATENT DOCUMENTS

CA 2 826 027 A1 9/2012
CN 102799311 A 11/2012
(Continued)

OTHER PUBLICATIONS

Database WPI ; XP-002732362.
The extended European Search Report of corresponding European Application No. 14166652.9, dated Nov. 21, 2014.

*Primary Examiner* — Joanna Pleszczynska
(74) *Attorney, Agent, or Firm* — Hodgson Russ LLP

(57) ABSTRACT

The present invention provides a single-layer multi-point touch-control conductive film and a method for producing the same. The single-layer multi-point touch-control conductive film includes a transparent substrate having a first surface; a bridging module provided on the first surface of the transparent substrate; a transparent polymer layer provided on the first surface of the transparent substrate, the transparent polymer layer covers the bridging module; the transparent polymer layer is formed with a first groove-like grid on the surface, the first groove-like grid is filled with a
(Continued)

conductive material, respectively forming a first electrode and a plurality of second electrode modules, the bridging module electrically connects two adjacent second electrode modules, to form a second electrode; and a conductive module, provided on the transparent polymer layer, and penetrating the transparent polymer layer; each of the second electrode modules is in electrical connection with the bridging module via the conductive module.

15 Claims, 8 Drawing Sheets

(58) Field of Classification Search
CPC ....... G06F 3/0416; G06F 3/0412; H01B 1/02; Y10T 428/24612; Y10T 428/24521; Y10T 428/24537; Y10T 428/24545
USPC .......... 428/172, 173, 161, 164; 174/98, 253; 345/173
See application file for complete search history.

(56) References Cited

U.S. PATENT DOCUMENTS

| 2012/0097424 | A1* | 4/2012 | Jo | ................... G02F 1/13439 |
| | | | | 174/126.4 |
| 2012/0234663 | A1* | 9/2012 | Hwang | ................... G06F 3/044 |
| | | | | 200/600 |

FOREIGN PATENT DOCUMENTS

| CN | 102903423 A | 1/2013 |
| WO | WO 2014/008733 A1 | 1/2014 |

* cited by examiner

US 9,640,294 B2

SINGLE-LAYER MULTI-POINT TOUCH-CONTROL CONDUCTIVE FILM

CROSS REFERENCE TO RELATED APPLICATIONS

This application claims priority to China Patent Applications No. 201310209616.5, 201310210075.8 and 201310210426.5, respectively filed with the Chinese Patent Office, on May 30, 2013, entitled "Single-layer Multi-point Touch-control Conductive Film and Method for Producing the Same", which are hereby incorporated herein by reference in their entireties.

FIELD OF THE TECHNOLOGY

The present invention relates to a touch-control conductive film, and more particularly, to a single-layer multi-point touch-control conductive film and a method for producing the same.

BACKGROUND

A transparent conductive film is a sensing element for receiving input signals, such as a touch in a touch screen. Currently, Indium tin oxide (ITO) layer is a crucial component of the transparent conductive film. Although technologies of manufacturing a touch-screen have been developed at a rather rapid speed, taking a projected capacitive screen as an example, the basic manufacturing process of the ITO layer has not changed much in recent years, ITO plating and ITO patterning are always unavoidable.

Since Indium is an expensive metallic material, costs of the touch screen can be greatly increased when taking ITO as the material of the conductive layer. Moreover, during the patterning process of the ITO conductive layer, the whole plated ITO film needs to be etched to form ITO patterns, and therefore large amounts of ITO is etched away in this process, which leads to pollution and a waste of large amounts of precious metal.

Accordingly, ITO materials and corresponding process make the product cost maintain at a high level, causing a higher cost in a traditional single-layer multi-point touch-control conductive film; and the bridging structure of the traditional single-layer multi-point touch-control conductive film is formed above the conductive pattern, an additional protective layer needs to be plated for level up and protection, adding thickness of the product and production links, and thus the traditional single-layer multi-point touch-control conductive film is thicker in the thickness and more complicated in the production process.

SUMMARY

In view of the above, there is a need to provide a single-layer multi-point touch-control conductive film having a thinner thickness, a lower cost and a relatively simple production process, and a method for producing the same.

A single-layer multi-point touch-control conductive film, including:

a transparent substrate, having a first surface and a second surface disposed opposite to the first surface;

a bridging module, being made of a conductive material, provided on the first surface of the transparent substrate;

a transparent polymer layer, provided on the first surface of the transparent substrate, where the transparent polymer layer covers the bridging module; the transparent polymer layer is formed with a first groove-like grid on the surface, the first groove-like grid is filled with a conductive material, respectively forming a first electrode and a plurality of second electrode modules, the first electrode is arranged extending along a first dimension direction, the plurality of second electrode modules are arranged at spaced intervals along a second dimension direction intersecting with the first dimension direction, the bridging module is configured to electrically connect two adjacent second electrode modules, so as to form a column of second electrodes extending along the second dimension direction; and a conductive module, provided on the transparent polymer layer, and penetrating the transparent polymer layer, so that the conductive module can be in direct electrical connection with the bridging module; each of the second electrode modules is in electrical connection with the bridging module via the conductive module, so as to form the second electrode.

Compared with the conventional single-layer multi-point touch-control conductive film, the above single-layer multi-point touch-control conductive film has at least advantages as follows:

1. The above single-layer multi-point touch-control conductive film is firstly provided with the transparent polymer layer on the transparent substrate, the transparent polymer layer is formed with a groove-like grid being filled with a conductive material, to form an electrode, and therefore, it is only necessary to form the groove-like grid on a position of forming the electrode and fill the conductive material into the groove-like grid, not necessary to form continuous conductive layer for etching, no matter whether the conductive material adopted is ITO, utilization rate of the material can be greatly improved, then cost can be reduced greatly, and manufacturing process can be simplified.

2. The bridging module of the above single-layer multi-point touch-control conductive film is firstly formed on the transparent substrate, and then provided with the groove-like grid after covering with the transparent polymer layer, forming a conductive pattern, so that the bridging module can be formed on the transparent polymer layer and the transparent substrate, the transparent substrate acts as a protective layer of the bridging module as well as an electrode forming layer, an additional protective layer is not necessary to protect the bridging module, not only reducing production links, but also reducing the thickness of the single-layer multi-point touch-control conductive film.

In an embodiment, the transparent substrate is a transparent glass substrate.

In an embodiment, the bridging module is made of a metallic conductive material in a line shape with a line width range of 500 nm~6 μm.

In an embodiment, the bridging module is made of a transparent conductive material.

In an embodiment, the conductive module is made of a transparent conductive material.

In an embodiment, the conductive module and the bridging module have transmittance of greater than 80%.

In an embodiment, the bridging module is a line segment, or a structure formed by two line segments being connected via at least one connecting line segment.

In an embodiment, the line segment has a width range of 1~6 μm.

In an embodiment, when the bridging module is the line segment, the conductive module is provided on two ends of the line segment; when the bridging module is the structure formed by two line segments being connected via at least one connecting line segment, the conductive module is provided on the two line segments.

In an embodiment, the conductive module is in a line segment shape with a width range of 500 nm~5 μm.

In an embodiment, the conductive film further comprises a light shielding layer, located on an edge of the transparent glass substrate, and made of ink or black resist.

In an embodiment, the first electrode is a driving electrode, and the second electrode is an sensing electrode.

In an embodiment, the single-layer multi-point conductive film further comprises a lead electrode, positioned at a non-viewing area of the single-layer multi-point touch-control conductive film, and the conductive material of the lead electrode is in electrical connection with the conductive material in the first groove-like grid.

In an embodiment, the surface edge of the transparent polymer layer corresponding to the non-viewing area of the single-layer multi-point touch-control conductive film is formed with a second groove-like grid being filled with a conductive material to form the lead electrode.

In an embodiment, the first groove-like grid and the second groove-like grid are a regular grid or a random grid.

In an embodiment, the first groove-like grid and the second groove-like grid have a groove width of d1 and a depth of h, wherein $1\ \mu m \leq d1 \leq 5\ \mu m$, $2\ \mu m \leq h \leq 6\ \mu m$, $h/d1 > 1$.

In an embodiment, the lead electrode is a grid-like or line-like conductive material formed on the transparent substrate or provided on the surface edge of the transparent polymer layer, and arranged corresponding to the non-viewing area of the single-layer multi-point touch-control conductive film.

In an embodiment, the transparent polymer layer is UV glue, imprint glue or polycarbonate.

In an embodiment, the single-layer multi-point touch-control conductive film further includes a transparent protective layer covering the transparent polymer layer, wherein the transparent protective layer is UV glue, imprint glue or polycarbonate.

In an embodiment, the first groove-like grid has a V-shaped, W-shaped, curved, or corrugated microgroove at the bottom of the groove.

In an embodiment, the microgroove has a depth range of 500 nm~1 μm.

The present invention also provides a method for producing the single-layer multi-point touch-control conductive film.

A method for producing the single-layer multi-point touch-control conductive film, including:

laying a conductive material on the first surface of the transparent substrate, to form the bridging module;

forming the conductive module on the bridging module;

laying a layer of transparent polymer on the first surface of the transparent substrate, with the transparent polymer embedded in the conductive module, to form the transparent protective layer;

forming the first groove-like grid on the surface of the transparent protective layer; and filling the first groove-like grid with a conductive material being in direct connection with the conductive module, to form the first electrode and the second electrode.

In an embodiment, the step of forming the conductive module on the bridging module includes:

forming a layer of photoresist layer on the first surface of the transparent substrate, with the photoresist layer covering the bridging module;

forming a hole, corresponding to the shape of the conductive module, on the bridging module with a developing method of photolithography.

filling the hole with a conductive material, to form the conductive module; and exposing the photoresist layer, so as to remove the photoresist layer.

In an embodiment, the transparent polymer layer is imprint glue, and the first groove-like grid is formed by imprinting.

In an embodiment, the transparent substrate is a transparent glass substrate, and the bridging module is made of a metallic conductive material and formed on the first surface of the transparent substrate by metal plating.

In an embodiment, the bridging module is made of a transparent conductive material and formed on the first surface of the transparent substrate by ink-jet printing.

DETAILED DESCRIPTION OF EMBODIMENTS

For convenience of understanding the present invention, it will be described more fully hereinafter with reference to the accompanying drawings. The drawings illustrate preferred embodiments of the present invention. The present invention may, however, be embodied in many different forms and not limited to the embodiments described herein. Rather, these embodiments are provided so that this disclosure will be thorough and complete.

It should be noted that, when an element is referred to as being "fixed on" another element, it can be directly on the other element or intervening elements may also be present. When an element is referred to as being "connected to" another element, it can be directly connected to the other element or intervening elements may also be present. The terms "vertical", "horizontal", "left", "right" and the like are used herein for the purpose of explanation only.

Unless defined otherwise, all technical and scientific terms used herein have the same meanings as commonly understood by persons skilled in the art to which this invention belongs. The terms used in the specification of the present invention are for the purpose of describing specific embodiments only and are not intended to limit the present invention. The term "and/or" herein includes any and all combinations of one or more of the associated listed items.

Figure 1:
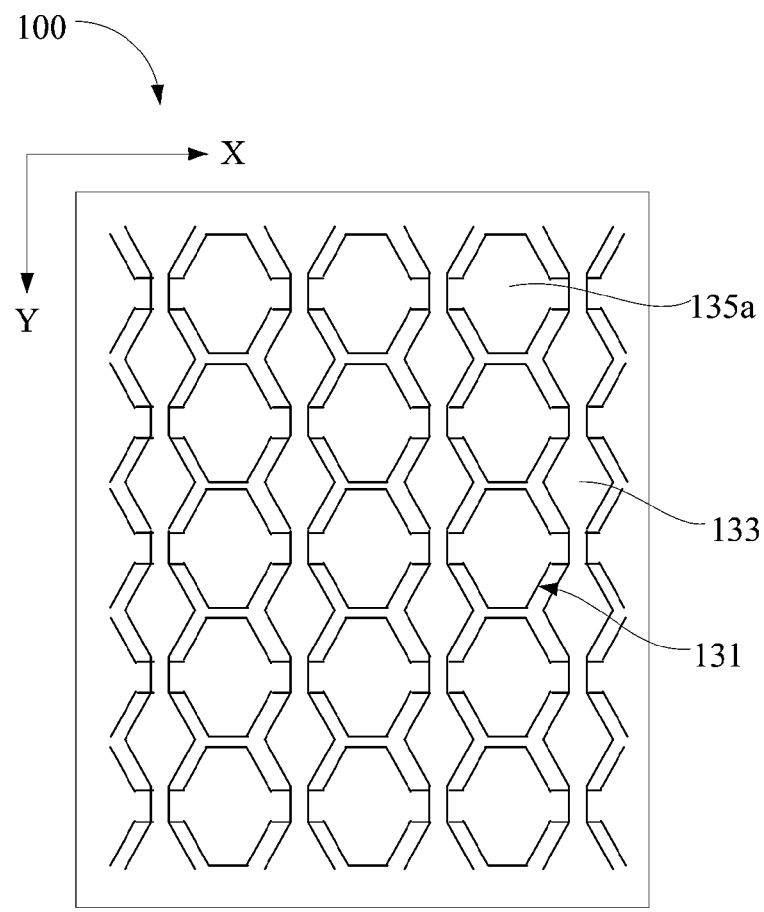
FIG. 1 is a top view of a single-layer multi-point touch-control conductive film according to a first embodiment of the present invention.
Figure 2:
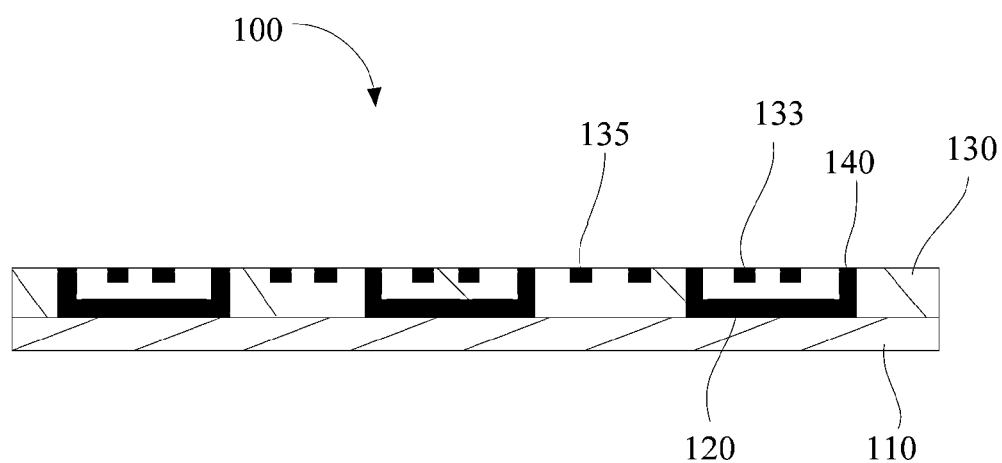
FIG. 2 is a sectional view of the single-layer multi-point touch-control conductive film illustrated in FIG. 1.

Refer to FIG. 1 and FIG. 2, the single-layer multi-point touch-control conductive film 100 according to a first embodiment of the present invention includes a transparent substrate 110, a bridging module 120, a transparent polymer layer 130 and a conductive module 140.

The transparent substrate 110 has a first surface and a second surface opposite to the first surface. The shape of the transparent substrate 110 can be designed according to the shape of the single-layer multi-point touch-control conductive film 100, for example, the transparent substrate 110 can be rectangular.

Figure 3A:
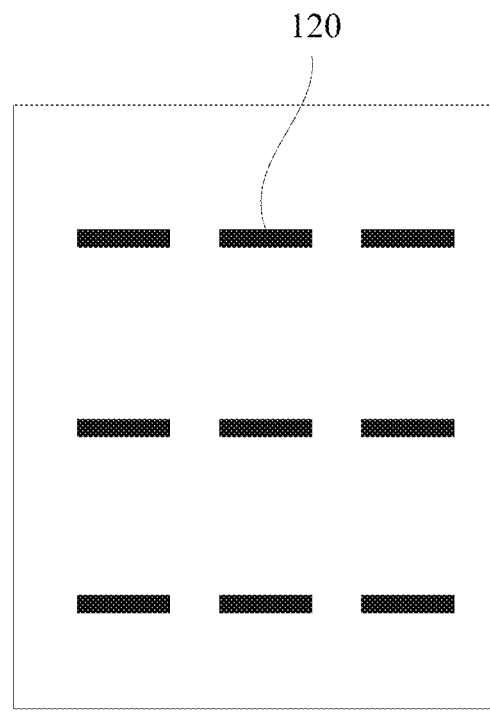
FIG. 3a to FIG. 3c are schematic structural diagrams of a bridging module of the single-layer multi-point touch-control conductive film according to various embodiments.
Figure 3B:
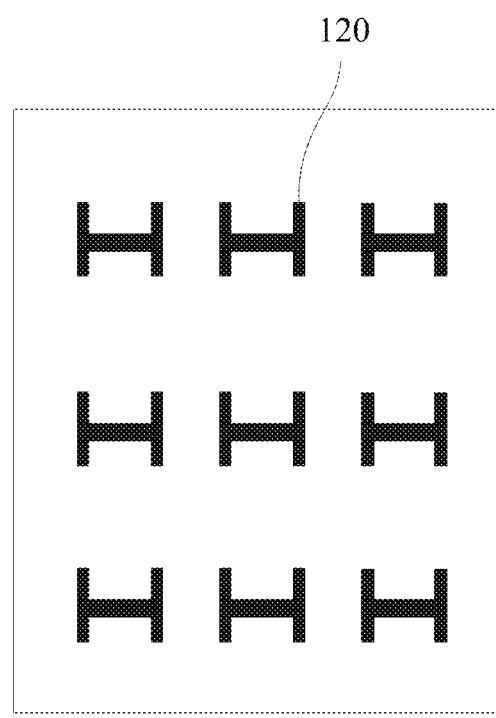
Figure 3C:
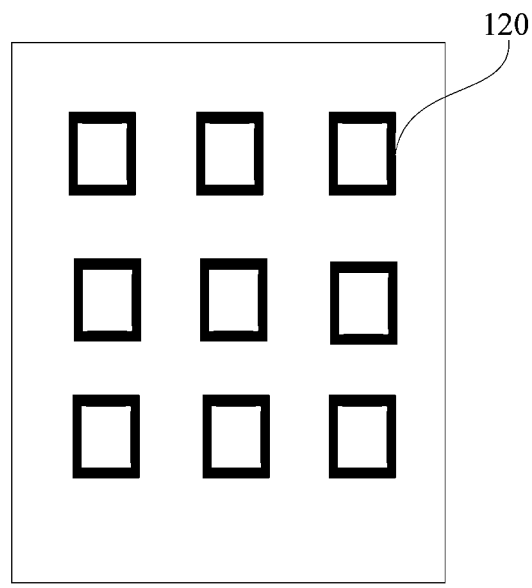
Figure 4A:
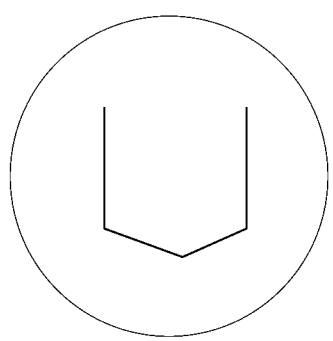
FIG. 4a to FIG. 4d are schematic structural diagrams of the bottom of the groove of the first groove-like grid in the transparent polymer layer of the single-layer multi-point touch-control conductive film illustrated in FIG. 1 according to various embodiments.
Figure 4B:
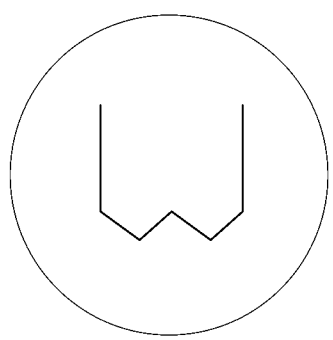
Figure 4C:
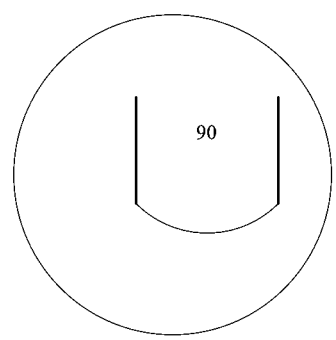
Figure 4D:
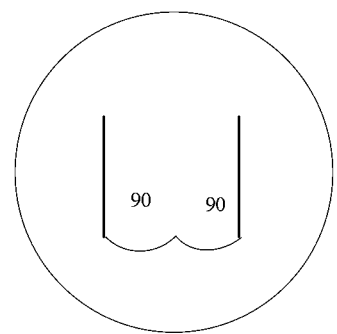

The bridging module 120, being made of a conductive material, is provided on the first surface of the transparent substrate 110. The bridging module 120 can be made of a metallic conductive material, and the transparent substrate 110 can be a transparent glass substrate in this state. The metallic conductive material may have a line shape with a line width range of 500 nm~6 μm. The metallic conductive material can be a nontransparent metallic conductive material with a line width range of 500 nm~6 μm, achieving a purpose of optical transparent and avoiding affecting a user's vision. The bridging module 120 also can be made of a transparent conductive material. The bridging module 120 can be a single line segment, or a structure formed by two line segments that are connected via at least one connecting line segment. Referring to FIG. 3a to FIG. 3c, for example, the bridging module 120 illustrated in FIG. 3a is a single line segment, the bridging module 120 illustrated in FIG. 3b is an H-shaped structure formed by two line segments being connected via one connecting line segment, and the bridging module 120 illustrated in FIG. 3c is a □-shaped structure formed by two line segments being connected via at two connecting line segments. Preferably, the line segment forming the bridging module 120 has a width range of 1~6 μm.

The transparent polymer layer 130 is provided on the first surface of the transparent substrate 110, and covers the bridging module 120. The transparent polymer layer 130 is formed with a first groove-like grid 131 on its surface, the first groove-like grid 131 is filled with a conductive material, respectively forming a first electrode 133 and a plurality of second electrode modules 135a. The first electrode 133 is arranged extending along a first dimension direction, and the plurality of second electrode modules 135a are arranged at spaced intervals along a second dimension direction intersecting with the first dimension direction. The bridging module 120 is configured to electrically connect two adjacent second electrode modules 135a, so as to form a column of second electrodes 135 extending along the second dimension direction.

Particularly, in the illustrated embodiments, the transparent polymer layer 130 can be UV glue, imprint glue or polycarbonate. The first electrode 133 can be a driving electrode, and the second electrode 135 can be a sensing electrode. The first dimension direction can be orthogonal, or inclined to the second dimension direction, particularly, in the illustrated embodiments, the first dimension direction is Y-axis and the second dimension direction is X-axis, constituting a rectangular coordinate system.

Further, the first groove-like grid 131 can have a V-shaped, W-shaped, curved, or corrugated microgroove at the bottom of the groove. Referring to FIG. 4a to FIG. 4d, the first groove-like grid 131 illustrated in FIG. 4a has a V-shaped microgroove at the bottom of the groove, the first groove-like grid 131 illustrated in FIG. 4b has a W-shaped microgroove at the bottom of the groove, the first groove-like grid 131 illustrated in FIG. 4c has a curved microgroove at the bottom of the groove, and the first groove-like grid 131 illustrated in FIG. 4d has a corrugated microgroove at the bottom of the groove. Preferably, the microgroove has a depth range of 500 nm~1 μm.

Since the first groove-like grid 131 can have a V-shaped, W-shaped, curved, or corrugated microgroove at the bottom of the groove, during drying of the conductive ink filled in the groove of the first groove-like grid 131, the dried conductive ink material does not easily break when the conductive ink shrinks during the solidification thereof.

The conductive module 140 is provided on the transparent polymer layer 130, and penetrating the transparent polymer layer 130, so that the conductive module 140 can be in direct electrical connection with the bridging module 120. Each of the second electrode modules 135a is in electrical connection with the bridging module 120 via the conductive module 140, so as to form the second electrode 135. For example, when the bridging module 120 is a line segment, the conductive module 140 is provided on two ends of the line segment; when the bridging module 120 has a structure formed by two line segments being connected via at least one connecting line segment, the conductive module 140 is provided on the two line segments.

Particularly, in the illustrated embodiments, the conductive module 140 is in a line segment shape with a width range of 500 nm~5 μm.

The conductive module 140 can be made of a transparent conductive material. Preferably, the conductive module 140 and the bridging module 120 have transmittance of greater than 80%.

Further, the single-layer multi-point touch-control conductive film further includes a lead electrode, provided in a non-viewing area of the single-layer multi-point touch-control conductive film 100, and the conductive material of the lead electrode is in electrical connection with the conductive material in the first groove-like grid.

Figure 5:
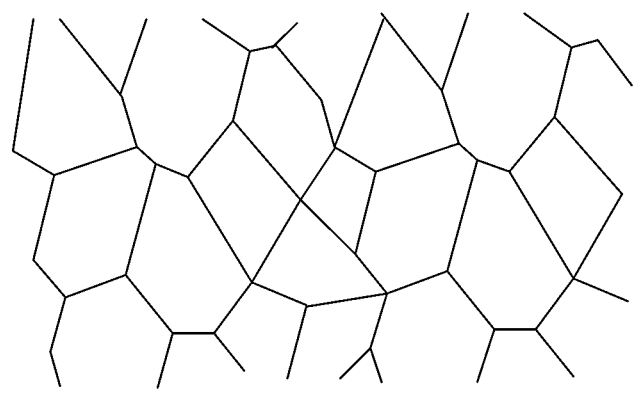
FIG. 5 illustrates the shape of the second groove-like grid in the transparent polymer layer of the single-layer multi-point touch-control conductive film illustrated in FIG. 1 according to an embodiment.
Figure 6:
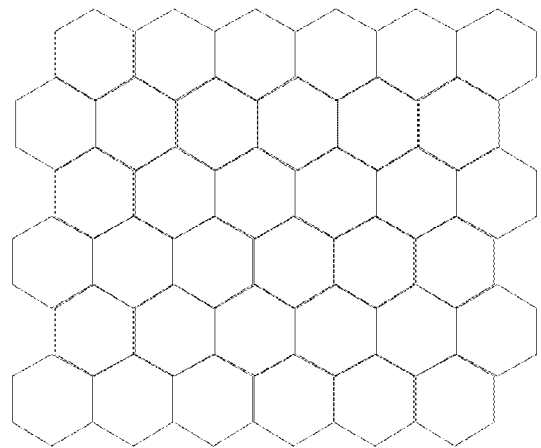
FIG. 6 illustrates the shape of the second groove-like grid in the transparent polymer layer of the single-layer multi-point touch-control conductive film illustrated in FIG. 1 according to another embodiment.

In an embodiment, the surface edge of the transparent polymer layer 130 corresponding to the non-viewing area of the single-layer multi-point touch-control conductive film 100 is formed with a second groove-like grid being filled with a conductive material to form the lead electrode. Refer to FIG. 5 and FIG. 6, the first groove-like grid and the second groove-like grid can be a regular grid or a random grid. Preferably, the first groove-like grid and the second groove-like grid have a groove width of d1 and a depth of h, where 1 μm≤d1≤5 μm, 2 μm≤h≤6 μm, h/d1>1.

In other embodiments, the lead electrode is a grid-like or line-like conductive material formed on the transparent substrate 110 or provided on the surface edge of the transparent polymer layer 130, and arranged corresponding to the non-viewing area of the single-layer multi-point touch-control conductive film 100.

Further, the single-layer multi-point touch-control conductive film 100 further includes a transparent protective layer covering the transparent polymer layer 130, and the transparent protective layer can be UV glue, imprint glue or polycarbonate.

It should be noted that, all the conductive materials in this embodiment are preferable transparent conductive materials and, of course, nontransparent conductive materials also can be used in other embodiments.

Figure 10:
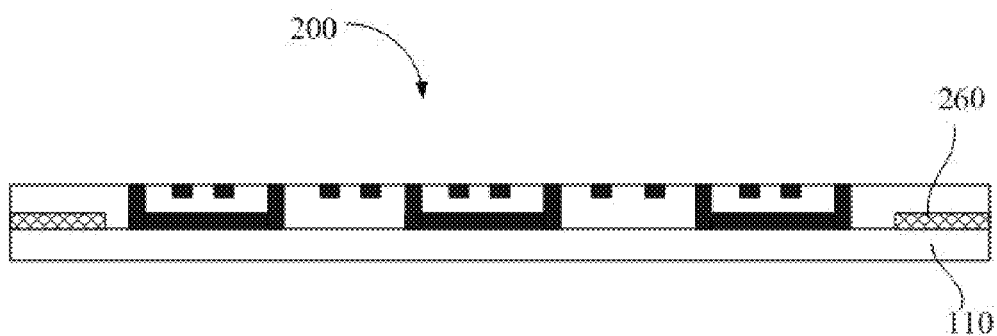
FIG. 10 is a top view of a single-layer multi-point touch-control conductive film according to a second embodiment of the present invention.

Referring to FIG. 10, a single-layer multi-point touch-control conductive film 200 in a second embodiment is substantially the same as the single-layer multi-point touch-control conductive film 100 in the first embodiment, except for that: the single-layer multi-point touch-control conductive film 200 further includes a light shielding layer 260, provided on the edge of the transparent substrate 110, for forming the non-viewing area. The light shielding layer 260 can be made of ink or black resist.

Compared with the conventional single-layer multi-point touch-control conductive film, the above single-layer multi-point touch-control conductive film 100 has at least the following advantages:

1. The above single-layer multi-point touch-control conductive film 100 is provided with the transparent polymer layer 130 on the transparent substrate 110, the transparent polymer layer 130 is formed with a groove-like grid being filled with a conductive material to form an electrode and, therefore, it is only necessary to form the groove-like grid on a position of forming the electrode and fill the conductive material into the groove-like grid, not necessary to form a continuous conductive layer in a large area and then etching it, no matter whether the conductive material adopted is ITO, utilization rate of the material can be greatly improved, thus cost can be reduced greatly, and manufacturing process can be simplified.

2. The bridging module 120 of the above single-layer multi-point touch-control conductive film 100 is firstly formed on the transparent substrate 110, then the transparent polymer layer 130 is provided to cover the bridging module 120, and the groove-like grid is provided to form a conductive pattern. In this way, the bridging module 120 is formed on the transparent polymer layer 130 and the transparent substrate 110, the transparent substrate acts as a protective layer of the bridging module as well as an electrode forming layer, thus no additional protective layer is necessary to protect the bridging module 120, which not only reduces production steps, but also reduces the thickness of the single-layer multi-point touch-control conductive film 100.

3. The bridging module 120 of the above single-layer multi-point touch-control conductive film 100 is made of a transparent conductive material, and the good transmittance thereof can guarantee the transmittance of the single-layer multi-point touch-control conductive film 100.

4. In the above single-layer multi-point touch-control conductive film 100, a metallic film is plated on a transparent glass substrate to form the bridging module 120 on the transparent substrate 110 and, therefore, good plating performance of the glass can be fully utilized to form the bridging module 120. Moreover, if the bridging module 120 adopts a nontransparent metallic conductive material, and the line width must be limited to maintain the transmittance, for example, the metallic conductive material of the bridging module 120 has a line width range of 500 nm~5 μm, which can promote optical transparent of metallic lines and avoid affecting a user's vision effect when viewed through the single-layer multi-point touch-control conductive film 100.

Meanwhile, the present invention also provides a method for producing a single-layer multi-point touch-control conductive film, e.g., for producing the above single-layer multi-point touch-control conductive film 100.

Figure 7:
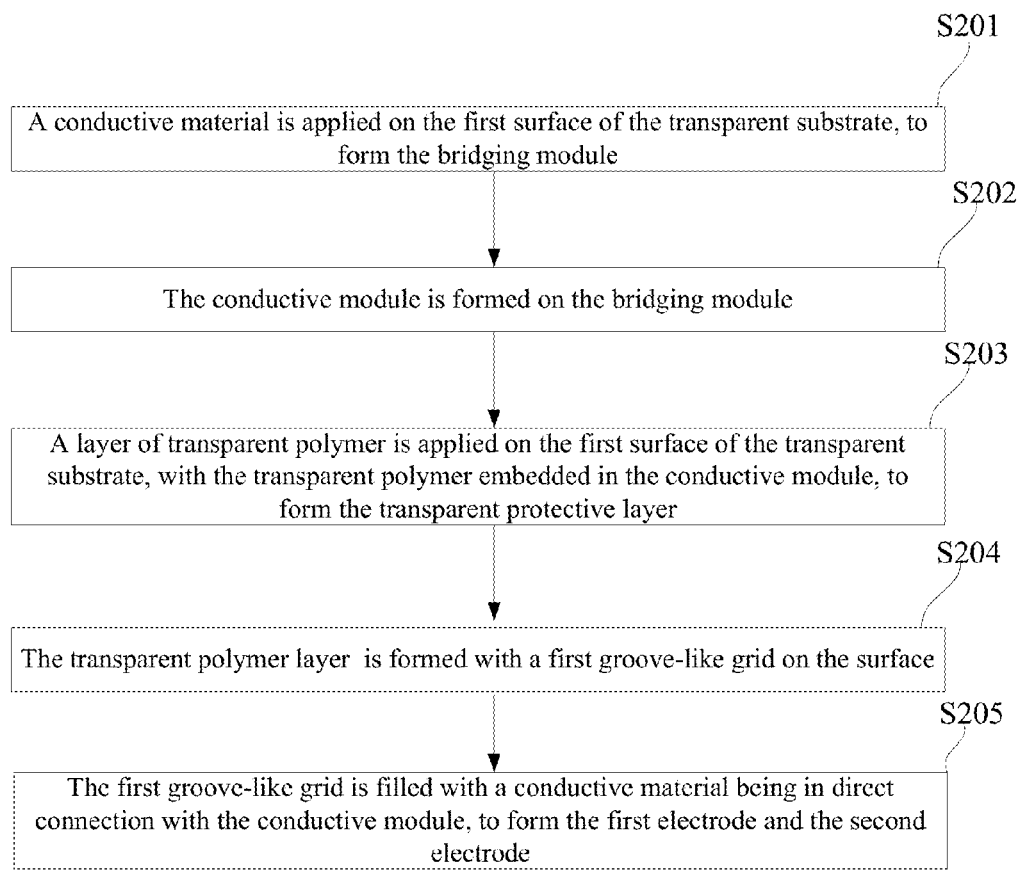
FIG. 7 is a flowchart of a method for producing the single-layer multi-point touch-control conductive film according to an embodiment of the present invention.
Figure 8A:
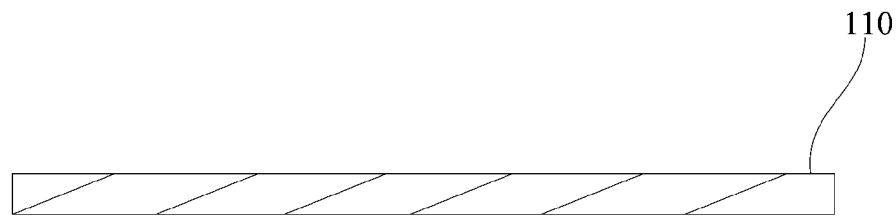
FIG. 8a to FIG. 8e are schematic structural diagrams of each step in the method for producing the single-layer multi-point touch-control conductive film according to an embodiment of the present invention.
Figure 8B:

Referring to FIG. 7, the method for producing the single-layer multi-point touch-control conductive film 100 in this embodiment includes steps S201~S205:

Step S201, as shown in FIG. 8a and FIG. 8b, a conductive material is applied on the first surface of the transparent substrate 110 to form the bridging module 120. The bridging module 120, being made of a conductive material, is provided on the first surface of the transparent substrate 110. The bridging module 120 can be a line segment, or a structure formed by two line segments being connected via at least one connecting line segment. For example, the bridging module 120 can be a line segment, an H-shaped structure formed by two line segments being connected via one connecting line segment, and a □-shaped structure formed by two line segments being connected via two connecting line segments. Preferably, the line segment forming the bridging module 120 has a width range of 1~6 μm.

Figure 8C:
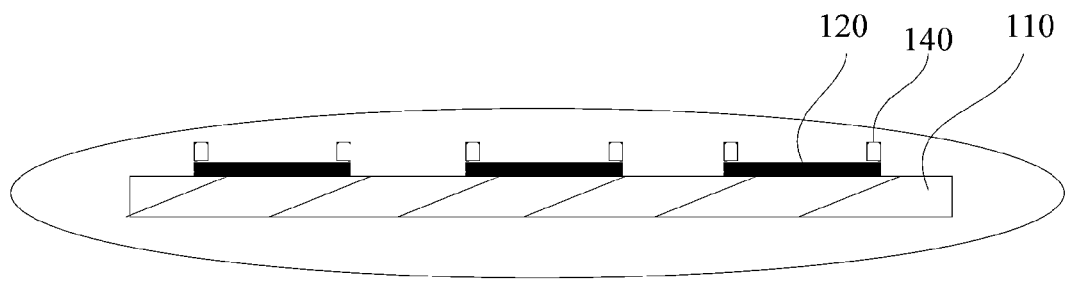

Step S202, as shown in FIG. 8c, the conductive module 140 is formed on the bridging module 120. The conductive module 140 is provided on the transparent polymer layer 130, and penetrating the transparent polymer layer 130, so that the conductive module 140 can be in direct electrical connection with the bridging module 120. Each of the second electrode modules 135a is in electrical connection with the bridging module 120 via the conductive module 140, so as to form the second electrode 135. For example, when the bridging module 120 is a line segment, the conductive module 140 is provided on two ends of the line segment; when the bridging module 120 is a structure formed by two line segments being connected via at least one connecting line segment, the conductive module 140 is provided on the two line segments. For example, the conductive module 140 is in a line segment shape with a width range of 500 nm~5 μm.

Figure 9A:
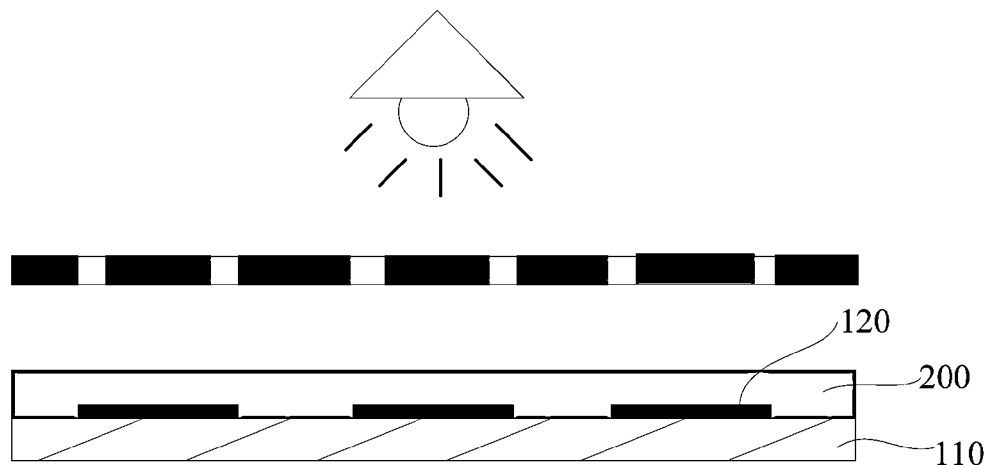
FIG. 9a to FIG. 9d are schematic structural diagrams of the step of forming a conductive module on a bridging module in the method for producing the single-layer multi-point touch-control conductive film according to an embodiment of the present invention.

Referring to FIG. 9a to FIG. 9d, particularly, in the illustrated embodiments, the step of forming the conductive module 140 on the bridging module 120 includes:

As shown in FIG. 9a, forming a layer of photoresist layer 200 on the first surface of the transparent substrate 110, with the photoresist layer 200 covering the bridging module 120; preferably, when the transparent substrate 110 is a transparent glass substrate, and the bridging module 120 is made of a metallic conductive material, the bridging module 120 forms on the first surface of the transparent substrate 110 by metal plating; when the bridging module 120 is made of a transparent conductive material, the bridging module 120 can be formed on the first surface of the transparent substrate 110 by ink-jet printing.

Figure 9B:
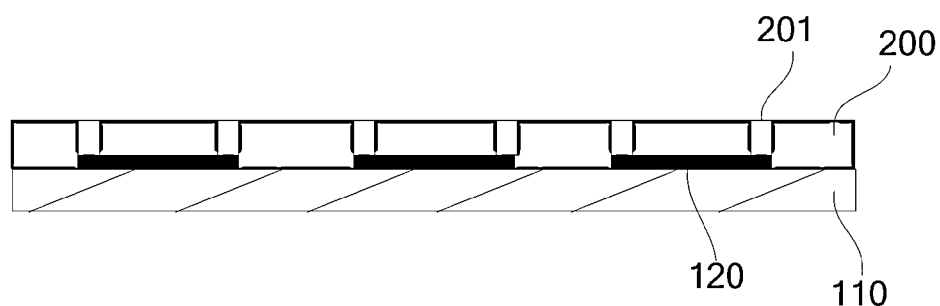
Figure 9C:
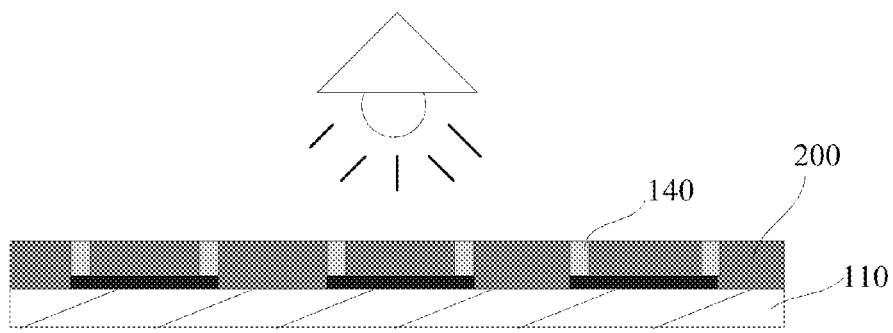
Figure 9D:
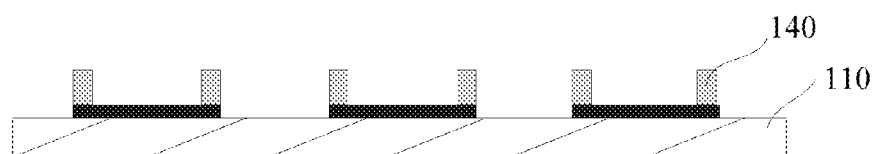

As shown in FIG. 9b, a hole 201, corresponding to the shape of the conductive module, is formed in the photoresist layer 200 exposing the bridging module 120 with a lithography method;

As shown in FIG. 9c, a conductive material is filled in the holes, to form the conductive module 140; and As shown in FIG. 9d, the photoresist layer 200 is removed.

Figure 8D:
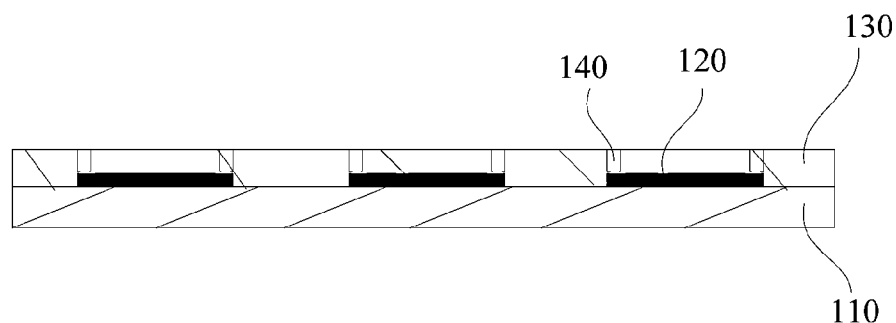

Step S203, as shown in FIG. 8d, a layer of transparent polymer is applied on the first surface of the transparent substrate 110, with the transparent polymer embedding the conductive module 140, to form the transparent protective layer 130. The transparent polymer layer 130 is provided on the first surface of the transparent substrate 110, and covers the bridging module 120. The transparent polymer layer 130 is formed with a first groove-like grid 131 on its surface, the first groove-like grid 131 is filled with a conductive material, respectively forming a first electrode 133 and a plurality of second electrode modules 135a. The first electrode 133 is arranged extending along a first dimension direction, and the plurality of second electrode modules 135a are arranged at spaced intervals along a second dimension direction intersecting with the first dimension direction. The bridging module 120 is configured to electrically connect two adjacent second electrode modules 135a, so as to form a column of second electrodes 135 extending along the second dimension direction.

Figure 8E:
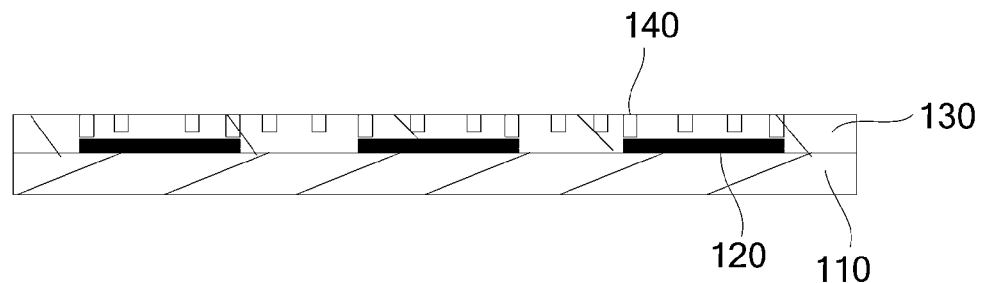

Step S204, as shown in FIG. 8e, the transparent polymer layer 130 is formed with a first groove-like grid 131 on its surface. The transparent polymer layer 130 can be UV glue, imprint glue or polycarbonate. The first groove-like grid 131 can have a V-shaped, W-shaped, curved, or corrugated microgroove at the bottom of the groove thereof. For example, the first groove-like grid 131 can have a V-shaped, W-shaped, curved, or corrugated microgroove at the bottom of the groove. Preferably, the microgroove has a depth range of 500 nm~1 µm.

Particularly, in the illustrated embodiments, the transparent polymer layer 130 is imprint glue, and forms the first groove-like grid 131 by imprinting.

Step S205, the first groove-like grid 131 is filled with a conductive material being in direct connection with the conductive module 140, to form the first electrode 133 and the second electrode 135. For example, the first electrode 133 can be a driving electrode, and the second electrode 135 can be an sensing electrode.

It should be noted that, if a light shielding layer needs to be formed on the transparent substrate, the method further includes a step of forming a light shielding layer on the transparent substrate before, at or after step S202. The light shielding layer can be formed on the transparent substrate by ink spraying and coating. Preferably, before the step S202, the method further includes a step of forming a light shielding layer on the transparent substrate.

The above embodiments only illustrate several embodiments of the present invention, which are specific and in detail, but cannot be construed as limiting the scope of the present invention. It should be noted that, various variations and modifications may be made by persons skilled in the art without departing from the concept of the present invention and shall fall within the protection scope of the present invention. Therefore, the protection scope of the present invention is subject to the appended claims.

What is claimed is:

1. A single-layer multi-point touch-control conductive film, comprising:
    a transparent substrate, having a first surface and a second surface opposite to the first surface;
    a bridging module, made of a conductive material and provided on the first surface of the transparent substrate;
    a transparent polymer layer, provided on the first surface of the transparent substrate, wherein the bridging module is embedded in the transparent polymer layer; the transparent polymer layer is formed with a first groove-like grid on a surface thereof, the first groove-like grid is filled with a conductive material, respectively forming a first electrode and a plurality of second electrode modules, the first electrode is arranged extending along a first dimension direction, the plurality of second electrode modules are arranged at spaced intervals along a second dimension direction intersecting with the first dimension direction, the bridging module is configured to electrically connect two adjacent second electrode modules, so as to form a column of second electrodes extending along the second dimension direction; and
    a conductive module, disposed at the transparent polymer layer, and penetrating through the transparent polymer layer, so that the conductive module is in direct electrical connection with the bridging module; each of the second electrode modules is in electrical connection with the bridging module via the conductive module, so as to form the second electrode.

2. The single-layer multi-point touch-control conductive film according to claim 1, wherein the bridging module is made of a metallic conductive material in a line shape with a line width range of 500 nm~6 µm.

3. The single-layer multi-point touch-control conductive film according to claim 1, wherein the bridging module comprises a line segment, or a structure formed by two line segments being connected via at least one connecting line segment.

4. The single-layer multi-point touch-control conductive film according to claim 3, wherein the line segment has a width range of 1~6 µm.

5. The single-layer multi-point touch-control conductive film according to claim 3, wherein, when the bridging module comprises the line segment, the conductive module is provided on two ends of the line segment; when the bridging module comprises the structure formed by two line segments being connected via at least one connecting line segment, the conductive module is provided on the two line segments.

6. The single-layer multi-point touch-control conductive film according to claim 5, wherein the conductive module is in a line segment shape with a width range of 500 nm~5 µm.

7. The single-layer multi-point touch-control conductive film according to claim 1, wherein the first electrode is a driving electrode, and the second electrode is a sensing electrode.

8. The single-layer multi-point touch-control conductive film according to claim 1, wherein the single-layer multi-point touch-control conductive film further comprises a lead electrode, provided in a non-viewing area of the single-layer multi-point touch-control conductive film, and the conductive material of the lead electrode is in electrical connection with the conductive material in the first groove-like grid.

9. The single-layer multi-point touch-control conductive film according to claim 8, wherein a surface edge of the transparent polymer layer corresponding to the non-viewing area of the single-layer multi-point touch-control conductive film is formed with a second groove-like grid being filled with a conductive material to form the lead electrode.

10. The single-layer multi-point touch-control conductive film according to claim 9, wherein the first groove-like grid and the second groove-like grid have a groove width of d1 and a depth of h, wherein 1 µm≤d1≤5 µm, 2 µm≤h≤6 µm, h/d1>1.

11. The single-layer multi-point touch-control conductive film according to claim 8, wherein the lead electrode is a grid-like or line-like conductive material formed on the transparent substrate or provided on the surface edge of the transparent polymer layer, and arranged corresponding to the non-viewing area of the single-layer multi-point touch-control conductive film.

12. The single-layer multi-point touch-control conductive film according to claim 1, wherein the transparent polymer layer is UV glue, imprint glue or polycarbonate.

13. The single-layer multi-point touch-control conductive film according to claim 1, further comprising a transparent protective layer covering the transparent polymer layer, wherein the transparent protective layer is UV glue, imprint glue or polycarbonate.

14. The single-layer multi-point touch-control conductive film according to claim 1, wherein the first groove-like grid has a V-shaped, W-shaped, curved, or corrugated microgroove at the bottom of the groove.

15. The single-layer multi-point touch-control conductive film according to claim 14, wherein the microgroove has a depth range of 500 nm~1 μm.

* * * * *